United States Patent
Smulovics et al.

(10) Patent No.: US 12,387,407 B1
(45) Date of Patent: Aug. 12, 2025

(54) SYSTEM AND METHOD CONFIGURED TO GENERATE A MEDIA PRESENTATION USING GENERATIVE ARTIFICIAL INTELLIGENCE

(71) Applicant: Morgan Stanley Services Group Inc., New York, NY (US)

(72) Inventors: Peter Smulovics, Great Neck, NY (US); Pinzhen Liao, White Plains, NY (US); Hongna Lu, New York, NY (US); Mira Patel, Fort McMurray (CA); Amir Siddavatam, Calgary (CA); Wassim Jabbour, Montreal Québec (CA)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 18/813,427

(22) Filed: Aug. 23, 2024

(51) Int. Cl.
   G06F 17/00 (2019.01)
   G06F 40/279 (2020.01)
   G06F 40/40 (2020.01)
   G06T 11/60 (2006.01)

(52) U.S. Cl.
   CPC .......... G06T 11/60 (2013.01); G06F 40/279 (2020.01); G06F 40/40 (2020.01)

(58) Field of Classification Search
   CPC ......... G06T 11/60; G06F 40/279; G06F 40/40
   See application file for complete search history.

(56) References Cited

U.S. PATENT DOCUMENTS

| | | | |
|---|---|---|---|
| 12,142,045 B1* | 11/2024 | Sakr | G06V 10/82 |
| 12,153,778 B2* | 11/2024 | Davidson | G06F 9/451 |
| 2019/0034536 A1* | 1/2019 | Papp | G06F 16/447 |
| 2023/0161972 A1* | 5/2023 | Härmä | G06F 40/56 704/9 |
| 2023/0205980 A1* | 6/2023 | Brockett | G06F 40/166 715/229 |
| 2024/0127511 A1* | 4/2024 | Brdiczka | G06F 40/30 |
| 2024/0249081 A1* | 7/2024 | UzZaman | G06F 40/40 |
| 2024/0273306 A1* | 8/2024 | Somaiya | G06F 40/186 |
| 2024/0320451 A1* | 9/2024 | Li | G10L 13/02 |
| 2024/0354309 A1* | 10/2024 | Sacheti | G06F 16/248 |
| 2024/0354513 A1* | 10/2024 | Hong | G06N 5/022 |
| 2024/0362286 A1* | 10/2024 | He | G06F 16/93 |

(Continued)

FOREIGN PATENT DOCUMENTS

| WO | WO-2023129348 A1 * | 7/2023 | G06F 40/151 |
|---|---|---|---|
| WO | WO-2024220078 A1 * | 10/2024 | G10H 1/0025 |

(Continued)

*Primary Examiner* — Laurie A Ries
(74) *Attorney, Agent, or Firm* — Leason Ellis LLP

(57) ABSTRACT

A system and method are configured to generate an enhanced media presentation from an initial media presentation having initial text using generative artificial intelligence (AI). An extraction module include a first generative AI module to extract a plurality of terms from the initial text. A prompt generating module includes a second generative AI module to generate a prompt from the plurality of terms. A presentation generating module includes a third generative AI module to generate enhancement media from the prompt, and to generate and output an enhanced media presentation combining the initial text with the enhancement media. The method implements the system.

17 Claims, 13 Drawing Sheets

(56) References Cited

U.S. PATENT DOCUMENTS

| | | | | |
|---|---|---|---|---|
| 2024/0362409 A1* | 10/2024 | Kuan | .................... | G06F 40/30 |
| 2024/0370479 A1* | 11/2024 | Hudetz | ................ | G06F 16/316 |
| 2024/0378232 A1* | 11/2024 | Gambhir | ................ | G06T 11/60 |
| 2024/0386197 A1* | 11/2024 | Perez | .................... | G06F 9/547 |
| 2024/0403558 A1* | 12/2024 | Petruk | ................ | G06F 40/232 |
| 2024/0403714 A1* | 12/2024 | Tinaz | .................... | G06N 3/045 |
| 2025/0078200 A1* | 3/2025 | Zhang | .................... | G06T 3/10 |

FOREIGN PATENT DOCUMENTS

| | | | | |
|---|---|---|---|---|
| WO | WO-2024242633 A1 * | 11/2024 | | |
| WO | WO-2024258414 A1 * | 12/2024 | ........... | G06F 40/216 |

\* cited by examiner

| EXTRACTED FEATURE | DEFAULT NUMBER OF TERMS | INSTRUCTIONS TO THE FIRST GENERATIVE AI MODULE |
|---|---|---|
| Theme | P=1 | From the contents of the input slide, extract P terms that represents the theme of the presentation in a very generic way. The terms selected should abstract away from the specifics of the input slide. Only list the word in your answer. Examples are law, technology, art, science, and business. |
| Adjective | Q=5 | From the contents of the input slide, extract Q terms that represent important adjectives that describe the contents. The adjectives should not paraphrase the contents. The adjectives selected should be relevant to the text from the input slide. |
| Color | R=5 | From the contents of the input slide, extract R terms as comma-separated names of colors that fit the ambiance of the input slide. |
| Image Style | S=5 | From the contents of the input slide, extract S terms as comma-separated terms that describing possible art and image styles that could fit in an accompanying image. |

FIG. 9

| EXTRACTED FEATURE | TERMS DESCRIBING THE FEATURE | | | | |
|---|---|---|---|---|---|
| Theme | Investment | - | - | - | - |
| Adjective | Committing | Additional | Profitable | Important | Investing |
| Color | Green | Gold | Blue | Grey | White |
| Image Style | Financial | Educational | Infographic | Professional | Simplistic |

FIG. 10

Based on the extracted features and terms of the extracted features, create a prompt for a scene using the extracted features and terms. The prompt is to describe every detail of a scene. The prompt should use at least one theme, at least one adjective, at least one color, and at least one image among the terms provided. The scene should be minimalistic and creative. The prompt should be at most 150 words in length.

FIG. 11

In the heart of a *professional* office, a *commitment* to investment is pervasive. A minimalistic, *light-grey* table with organized piles of *blue* and *white* reports radiate an air of importance.

On its polished surface, a *green* laptop flickers with an infographic detailing profitable ventures, adorned with *simple* additional yet crucial data.

Golden rays seep through the sleek window, delicately stroking the laptop's keyboard. The room exudes a distinct *educational* ambiance – a silent seminar in *investing*.

Every corner bears witness to the purposeful hustle, the passionate pursuit of *financial* wisdom found through the simplistic interpretation of numbers; a scene that subtly illustrates the heart of *investment*.

FIG. 12

SYSTEM AND METHOD CONFIGURED TO GENERATE A MEDIA PRESENTATION USING GENERATIVE ARTIFICIAL INTELLIGENCE

FIELD OF THE DISCLOSURE

The present disclosure relates generally to media presentations, and, more particularly, to a system and method configured to generate a media presentation using generative artificial intelligence.

BACKGROUND OF THE DISCLOSURE

Media presentations are very important to convey information in a summary format to an audience. For example, media presentations employ visual charts of data summarizing large tables of data, since visual charts convey trends which displayed raw numerical data cannot readily convey in a short time. In addition, text on consecutive slides describing ideas to an audience are often summarized using short phrases as well as bullet points. Good visuals are hard to find, and so media presentations with large numbers of words and numbers are usually ignored by the audience and have the effect of a very dry delivery of ideas by the presenter. Accordingly, despite such use of charts, bullet points, and other features used in media presentations, including cartoons, which are meant to quickly convey information, there is a low engagement rate of audiences to media presentations.

Artificial intelligence (AI) has many applications, including the creation of new media, such as text, an audio file, an image, an animation, and a video. Therefore, the use of AI in creating a media presentation is promising to counter the dry delivery and low engagement rate of known media presentations. However, even though AI has evolved, on occasion, an AI engine may create media having content including gibberish from the human perspective. In the field of media presentations, media is created and output from known presentation software, such as POWERPOINT publicly available from MICROSOFT CORPORATION. However, when AI is applied to presentation software to create media presentations, any generated content including gibberish can embarrass a presenter.

For example, as shown in FIG. 1, a user can generate a slide 100 including text 102. In one implementation, the user manually generates the slide 100 by inputting text 102 and commands into known presentation software. In addition to the text 102, the slide 100 optionally includes formatting such as a border 104 around the periphery of the slide 100, and bullet points 106 corresponding to portions of the text 102. In one implementation, the slide 100 is a page generated and displayed by presentation software. In another implementation, the slide 100 is a webpage with the text 102, generated using webpage authoring software. For example, the webpage stores the text 102 in a HyperText Markup Language (HTML). The webpage uses delimiters positioned on each side of a line or multiple lines of text 102, such as the delimiters "<>" and "</>". For example, the text 102 includes tags such as "<body>" and "</body>" on either side of the plain text to be displayed on the webpage. The webpage-based slide 100 is displayed by a web browser as presentation software.

Attempts have been made to utilize AI to automatically enhance such a slide 100. In one implementation, AI has been utilized to add an image to the slide 100 in response to a prompt, such as the example prompt 200 shown in FIG. 2A having a command 202 and the text 102 of the slide 100. In one implementation, a user inputs the command 202 as well as the text 102 to generate the prompt 200 in natural language, such as English or a preset natural language. The prompt 200 is applied to an AI-based computer program, such as the DALL-E model, publicly available from OPENAI, to add an image to the slide 100 or to generate an enhanced slide 204, as shown in FIG. 2B. Such AI-based computer programs can create realistic images and art from a description in natural language.

For example, using an AI-based computer program, the enhanced slide 204 includes a border 206 around the text 208, as well as other images 210. In addition, the text 208 is derived from the text 102 in the slide 100 shown in FIG. 1. However, known AI-based computer programs, such as DALL-E, occasionally generate such an enhanced slide 204 with the text 208 garbled to appear as gibberish to a human viewer, as shown in FIG. 2B. In addition, the known AI-based computer programs garble the images 206, 210. For example, in FIG. 2B, the image 210 appears to be a distorted dollar sign "$".

In another implementation shown in FIGS. 3A-3B, a user generates a prompt 300 with a command 302 to generate an image to be associated with the slide 100 in FIG. 1. In the example shown in FIG. 3A, the prompt 300 instructs an AI-based computer program, such as DALL-E, to generate an image that represents investing with a large chart showing upward trends. The prompt 300 is applied to an AI-based computer program, such as DALL-E, to generate such an image 304, as shown in FIG. 3B. However, known AI-based computer programs, such as DALL-E, occasionally generate inaccurate, garbled, or inappropriate images, such as the image 304 which illustrates a chart with numerous plot lines 306 going in multiple directions instead of the desired upward or a generally upward trend.

Such images 204, 304 in FIGS. 2B and 3B, respectively, generated by known AI-based computer programs, fail to serve the intended purpose of applying AI to presentations; that is, to present and enhance information to convey additional information and to improve engagement of the viewer with the content of the presentation.

Other known problems with AI-based computer programs used to generate media presentations include the time required to write a sufficiently detailed or lengthy description for each slide in a presentation, the occurrence of meaningless combinations of letters and numbers, and repetition of images or similar images when a single topic is being summarized.

SUMMARY OF THE DISCLOSURE

According to an implementation consistent with the present disclosure, a system and method are configured to generate a media presentation using generative artificial intelligence.

In an implementation, a presentation enhancement system is configured to enhance an initial media presentation having initial text. The presentation enhancement system includes a hardware-based processor, a memory, and a set of modules. The memory configured to store instructions and configured to provide the instructions to the hardware-based processor. The set of modules are configured to implement the instructions provided to the hardware-based processor. The set of modules includes an extraction module, a prompt generating module, and a presentation generating module. The extraction module includes a first generative artificial intelligence (AI) module configured to automatically extract a plurality of terms from the initial text. The prompt generating module includes a second generative AI module configured to automatically generate a prompt from the plurality of terms. The presentation generating module includes a third generative AI module configured to automatically generate enhancement media from the prompt, and to automatically generate and output an enhanced media presentation combining the initial text with the enhancement media.

The third generative AI module can automatically generate an image as the enhancement media from the prompt. The first and second generative AI modules can be text-to-text generative AI modules, wherein the plurality of features and the prompt can be in a text format, and the third generative AI module can be a text-to-image generative AI module configured to automatically generate an image as the enhancement media from the text-formatted prompt. Each of the first, second, and third generative AI modules can include a neural network configured as a transformer to implement a large language model. The plurality of features can include a theme, an adjective, a color, and an image style. The extraction module further comprises a theme extraction module configured to extract the theme from the initial text, an adjective extraction module configured to extract the adjective from the initial text, a color extraction module configured to extract the color from the initial text, and an image style extraction module configured to extract the image style from the initial text.

The third generative AI module can automatically generate the enhancement media from the prompt using a temperature parameter. The value of the temperature parameter can be set to a predetermined temperature value between 0.5 and 1.0, inclusive. Alternatively, the value of the temperature parameter can be set to a randomized temperature value between 0.5 and 1.0, inclusive.

In another implementation, a presentation enhancement system is configured to enhance an initial media presentation having initial text. The presentation enhancement system comprises a hardware-based processor, a memory, and a set of modules. The memory is configured to store instructions and configured to provide the instructions to the hardware-based processor. The set of modules is configured to implement the instructions provided to the hardware-based processor. The set of modules includes an extraction module, a prompt generating module, and a presentation generating module. The extraction module can include a first generative artificial intelligence (AI) module implementing a first large language model and configured to automatically extract a plurality of terms from the initial text. The prompt generating module can include a second generative AI module implementing a second large language model and configured to automatically generate a prompt from the plurality of terms. The presentation generating module can include a third generative AI module implementing a third large language model and configured to automatically generate enhancement media from the prompt, and to automatically generate and output an enhanced media presentation combining the initial text with the enhancement media.

The third generative AI module can automatically generate an image as the enhancement media from the prompt. The first and second generative AI modules can be text-to-text generative AI modules, wherein the plurality of features and the prompt can be in a text format. The third generative AI module can be a text-to-image generative AI module configured to automatically generate an image as the enhancement media from the text-formatted prompt. Each of the first, second, and third generative AI modules can include a neural network configured as a transformer to implement the first, second, and third large language models, respectively. The plurality of features can include a theme, an adjective, a color, and an image style. The extraction module can further comprise a theme extraction module configured to extract the theme from the initial text, an adjective extraction module configured to extract the adjective from the initial text, a color extraction module configured to extract the color from the initial text, and an image style extraction module configured to extract the image style from the initial text.

The third generative AI module can automatically generate the enhancement media from the prompt using a temperature parameter. The value of the temperature parameter can be set to a predetermined temperature value between 0.5 and 1.0, inclusive. Alternatively, the value of the temperature parameter can be set to a randomized temperature value between 0.5 and 1.0, inclusive.

In a further implementation, a computer-based method comprises receiving initial input data representing an initial media presentation, automatically extracting at least one term for at least one feature from the initial input data using a first generative artificial intelligence (AI) module, providing a prompt instruction, automatically generating a prompt from the extracted at least one term and from the prompt instruction using a second generative AI module, automatically generating an enhancement media from the prompt using a third generative AI module, and generating and outputting an enhanced media presentation from the initial input data and the enhancement media. Each of the first, second, and third generative AI modules can include a neural network configured as a transformer to implement a large language model.

Any combinations of the various embodiments, implementations, and examples disclosed herein can be used in a further implementation, consistent with the disclosure. These and other aspects and features can be appreciated from the following description of certain implementations presented herein in accordance with the disclosure and the accompanying drawings and claims.

BRIEF DESCRIPTION OF THE DRAWINGS

FIG. 9 is a table of instructions to perform extraction of terms.

FIG. 10 is a table of extraction results.

FIG. 11 is an instruction to create a prompt based on the extraction results of FIG. 10.

FIG. 12 is a prompt generated using the instruction of FIG. 11.

It is noted that the drawings are illustrative and are not necessarily to scale.

DETAILED DESCRIPTION OF CERTAIN EMBODIMENTS OF THE DISCLOSURE

Example embodiments and implementations consistent with the teachings included in the present disclosure are directed to a system 400 and method 1500 configured to generate a media presentation using generative artificial intelligence (AI).

Figure 1:
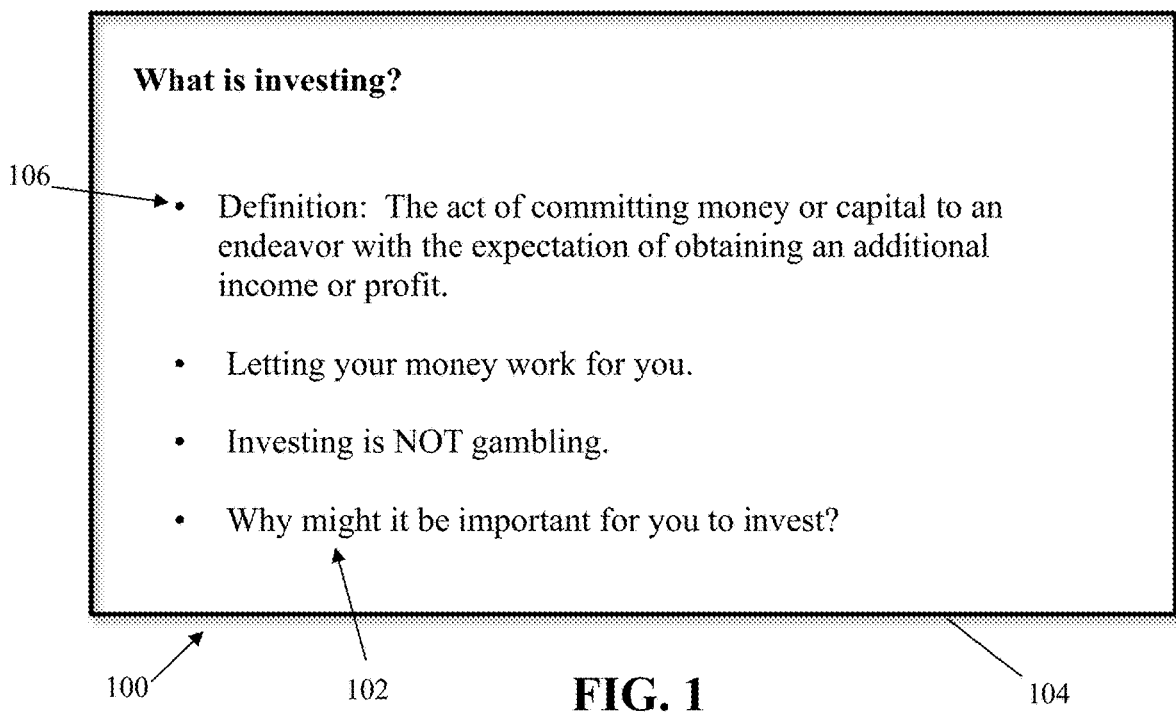
FIG. 1 illustrates an example of a presentation slide to be enhanced.
Figure 2A:
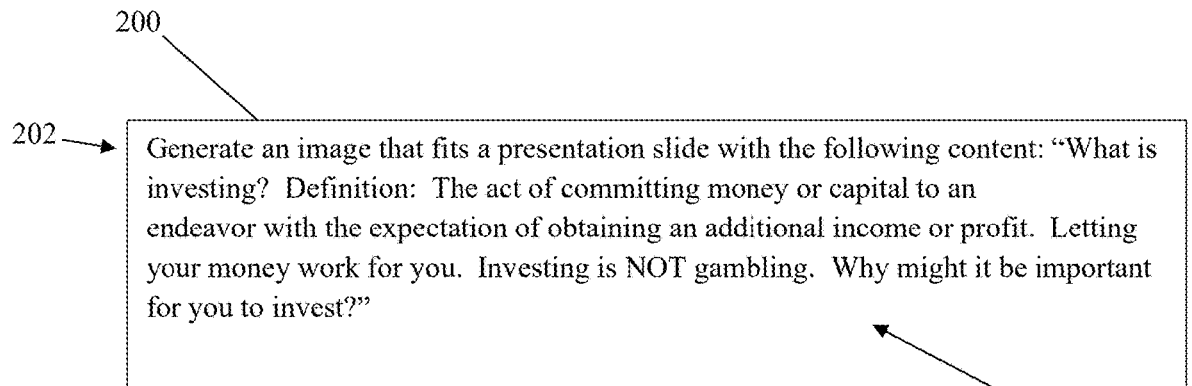
FIG. 2A is a prompt to generate an image for the slide of FIG. 1.
Figure 2B:
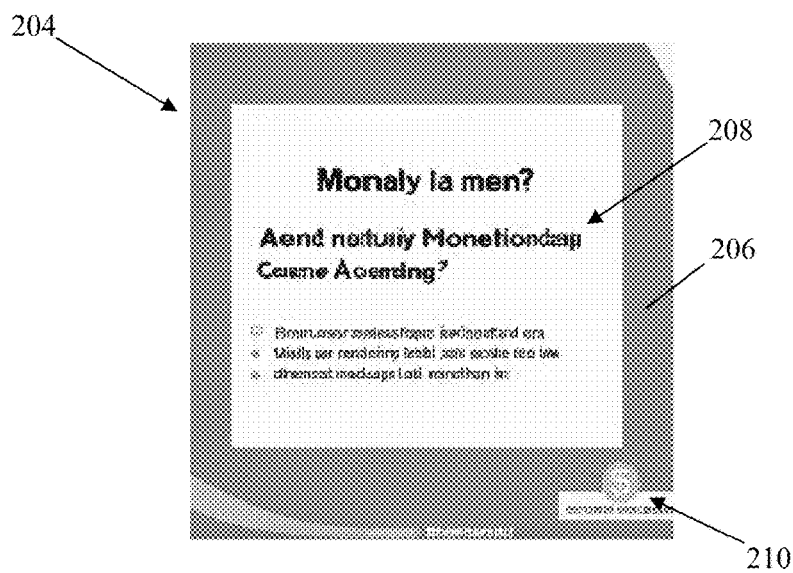
FIG. 2B illustrates an example of an AI-generated image using the prompt in FIG. 2B.
Figure 3A:
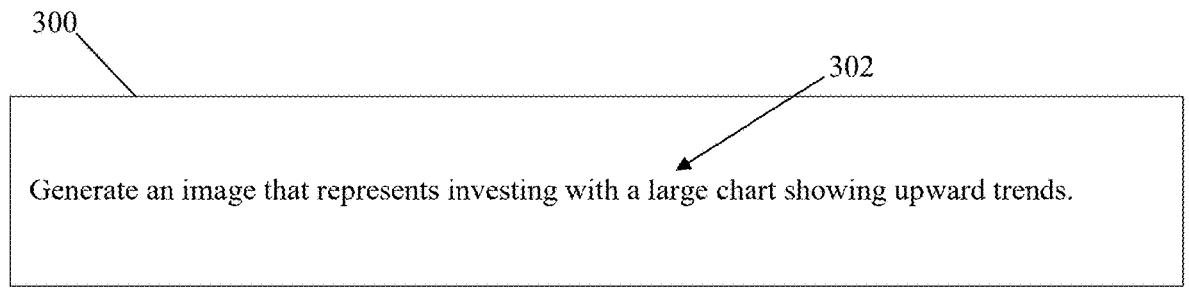
FIG. 3A is a prompt to generate an image representing a chart.
Figure 3B:
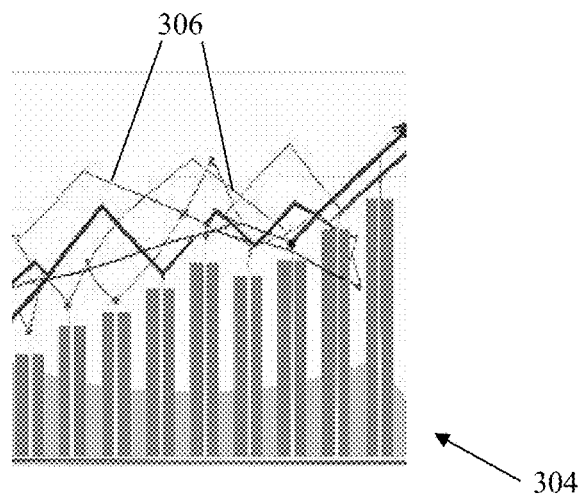
FIG. 3B illustrates an example of an AI-generated chart using the prompt in FIG. 3A.
Figure 4:
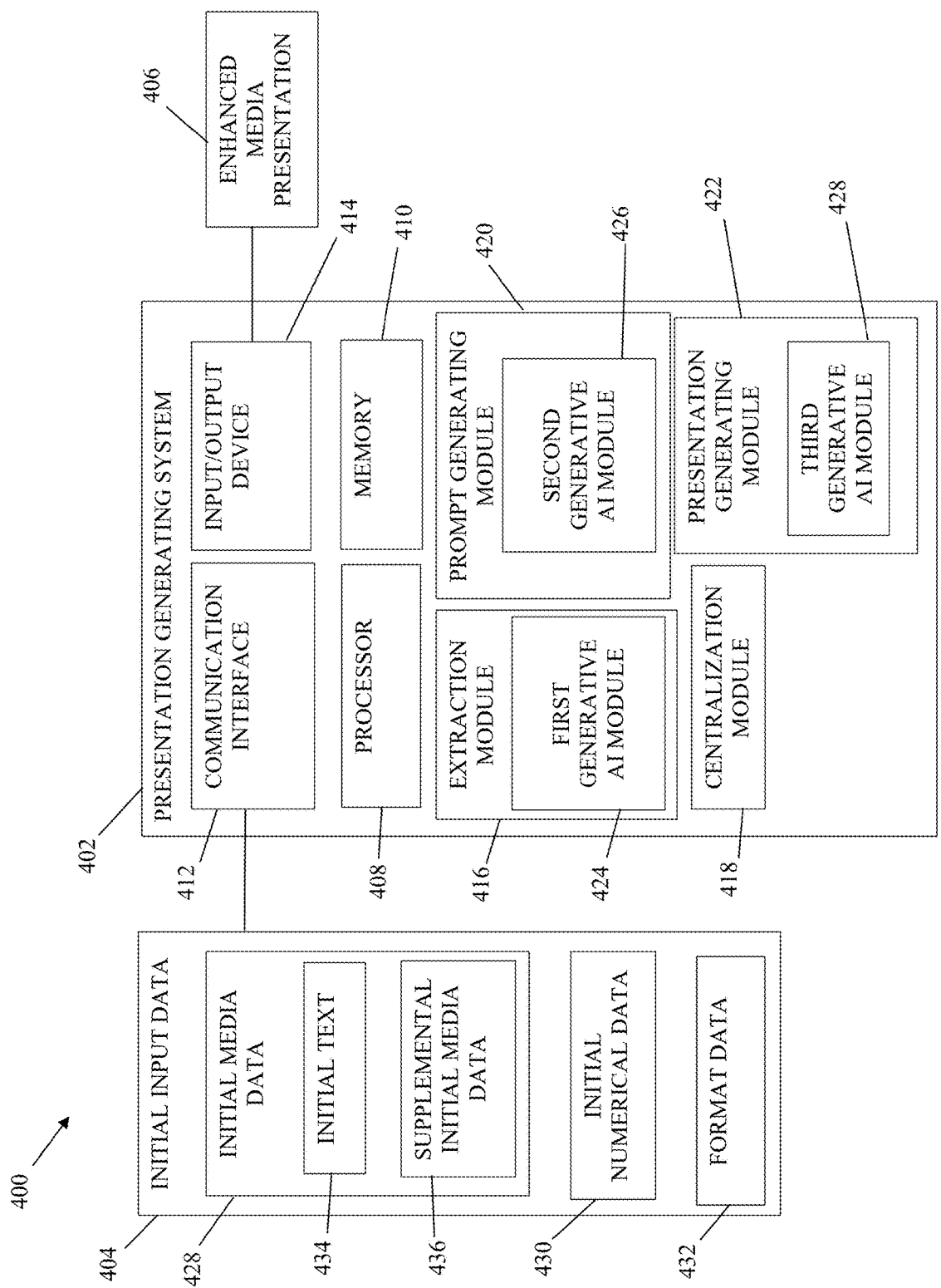
FIG. 4 is a schematic of a system, according to an implementation.

Referring to FIG. 4, in an implementation consistent with the invention, the system 400 includes a presentation generating system 402 configured to receive initial input data 404 and to automatically generate an enhanced media presentation 406. The generated enhanced media presentation 406 is a presentation which enhances the initial input data 404 with enhancement generated using generative AI techniques. In an implementation, the initial input data 404 specifies an initial media presentation including media, such as text as well as an image, audio, animation, video, numerical data, a graph representing numerical data, or any other known media. For example, the initial input data 404 specifies a slide for use in presentations, such as the slide 100 shown in FIG. 1, as described below in greater detail. The generated enhanced media presentation 406 is an enhanced version of the initial media presentation such as the slide 100. For example, the generated enhanced media presentation 406 includes at least one image added to the text 102 in FIG. 1, such that the added at least one image complements, supplements, or is otherwise relevant to the text 102 or other information presented on the slide 100. In another example, the generated enhanced media presentation 406 includes at least one of text, an image, audio, animation, video, numerical data, a graph representing numerical data, or any other known media configured to complement, supplement, or otherwise be relevant to the text 102 or other information presented on the slide 100.

In one implementation, the presentation generating system 402 includes a hardware-based processor 408, a memory 410 configured to store instructions and configured to provide the instructions to the hardware-based processor 408, a communication interface 412, an input/output device 414, and a set of modules 416-428 configured to implement the instructions provided to the hardware-based processor 408. In an implementation, the set of modules 416-428 include an extraction module 416, a centralization module 418, a prompt generating module 420, and a presentation generating module 422. The extraction module 416 includes a first generative AI module 424 configured to perform extraction operations using generative AI techniques, as described below. The prompt generating module 420 includes a second generative AI module 426 configured to perform prompt generating operations using generative AI techniques, as described below. The presentation generating module 422 includes a third generative AI module 428 configured to generate a presentation using generative AI techniques, as described below. In another implementation, the presentation generating system 402 operates the set of modules 416-428 using an application written in the PYTHON programming language. In a further implementation, the presentation generating system 402 operates the set of modules 416-428 using an application written in FLASK, which is a small and lightweight PYTHON software framework. In still another implementation, the presentation generating system 402 operates the set of modules 416-428 using any known operating system or control application written in any known programming language.

In one implementation, the first generative AI module 424, the second generative AI module 426, and the third generative AI module 428 are separate and independent from each other. In an alternative implementation, the first generative AI module 424, the second generative AI module 426, and the third generative AI module 428 are integrated into a single generative AI module configured to perform generative AI operations for the extraction module 416, for the prompt generating module 420, and for the presentation generating module 422, as described below. In another alternative implementation, since the third generative AI module 428 is a text-to-image generating module, as described in greater detail below, while the first generative AI module 424 and the second generative AI module 426 are text-to-text generating modules, as described in greater detail below, the first generative AI module 424 and the second generative AI module 426 are integrated into a single generative AI module configured to perform generative AI operations for the extraction module 416 and for the prompt generating module 420, as described below.

In one implementation, the system 400 is operatively connected to a data source through a network to transmit, convey, or otherwise provide the initial input data 404 to the presentation generating system 402. For example, the network is the Internet. In another example, the network is an internal network or intranet of an organization. In a further example, the network is a heterogeneous or hybrid network including the Internet and the intranet. In one implementation, the data source is a database configured to store the initial input data 404. In another implementation, the data source is a user device through which a user generates the initial input data 404, for example, by user inputs, selections, or commands from the user to the user device.

In an implementation consistent with the invention, the initial input data 404 includes initial media data 428. Optionally, the initial input data 404 includes initial numerical data 430 and format data 432. The initial media data 428 includes initial text 434 and optionally supplemental initial media data 436. For example, the initial input data 404 specifies the slide 100 including the text 102 shown in FIG. 1. In an implementation, the initial text 434 is in a text-based format. In one implementation, the slide 100 is a page generated and displayed by known presentation software, such as POWERPOINT publicly available from MICROSOFT CORPORATION. In an implementation, the user manually generates the slide 100 by inputting the text 102 as the initial text 434 as well as commands or other selections into the known presentation software. In one implementation, the text 102 is a text file having the American Standard Code for Information Interchange (ASCII) file format. In addition to the text 102, the slide 100 optionally includes formatting such as a border 104 around the periphery of the slide 100, and bullet points 106 corresponding to portions of the text 102. For example, the formatting for the border 104 and the bullet points 106 are specified by the format data 432.

In another implementation, the slide 102 includes other media, such as audio files, video files, animation files, graphical image data, or other known media specified by the supplemental initial media data 436. For example, the audio files are Waveform Audio File Format (WAV) files, the video files are Moving Picture Experts Group (MPEG) files, and the animation files and the graphical image data are Graphics Interchange Format (GIF) files. In an implementation, consistent with the invention, the slide 102 includes any known media in any other known media formats. In another implementation, the slide 100 includes numerical data, such a table of numbers specified by the initial numerical data 430. For example, the numerical data includes corporate profits over a range of years, with the initial text 434 including legends for the corporate profits and for the range of years. In a further implementation, the slide 100 includes a graph, a pie chart, or other images specified by the supplemental initial media data 436 which corresponds to and illustrates the initial numerical data 430.

In an additional implementation consistent with the invention, the slide 100 is a webpage specified by the initial input data 404, with the text 102 specified by the initial text 434 and with formatting specified by the format data 432. The slide 100, as a webpage, is generated using webpage authoring software which receives and processes the initial input data 404. For example, the webpage stores the initial text 434 as the text 102 in a HyperText Markup Language (HTML). The webpage uses delimiters positioned on each side of a line or multiple lines of initial text 434, such as the delimiters "< >" and "</>". For example, the initial text 434 includes the tags such as "<body>" and "</body>" on either side of text 102 to be displayed on the webpage. In another example, the initial text 434 includes text corresponding to the text 102, and the format data 432 in the initial input data 404 indicates the tags such as "<body>" and "</body>". The webpage-based slide 100 is displayed by a web browser as a presentation software responsive to the initial input data 404.

In an alternative implementation, the initial input data 404 is formatted in the Standard Generalized Markup Language (SGML), Extensible Markup Language (XML), or any known data format configured to be processed and then outputted or displayed by any known presentation software, such as POWERPOINT publicly available from MICROSOFT CORPORATION, as well as web browsers such as CHROME publicly available from GOOGLE LLC, or EDGE publicly available from MICROSOFT CORPORATION, and any other known data output device or software.

The input/output device 414 outputs the enhanced media presentation 406 generated by the presentation generating system 402. In one implementation, the input/output device 414 includes a physical printer configured to generate and output a hardcopy of the enhanced media presentation 406. For example, the enhanced media presentation 406 is an enhanced version of the slide 100 in FIG. 1, in which media as described above are added to the slide 100. In one example, the enhanced media presentation 406 has text or an image added to the slide 100. The hardcopy of the enhanced media presentation 406 has the added text or image included on the slide 100. For example, the image added to the slide 100 and included in the enhanced media presentation 406 is a graphical image. The graphical image includes photos, graphs illustrating numerical values, uniform resource locator (URL) addresses of websites, quick-response (QR) codes encoding information such as URL addresses, barcodes, etc.

In another implementation, the input/output device 414 includes a display or monitor configured to generate and display the enhanced media presentation 406 with any visual media, including text, images, video, animation, or any known visual media added to the displayed slide 100. In a further implementation, the input/output device 414 includes a sound speaker configured to output any audio media, including sound, video, or any known audio media generated by the presentation generating system 402 to be associated with the slide 100 and so enhancing the slide 100. In another implementation, the input/output device 414 is configured to output both visual media and audio media included in the enhanced media presentation 406 to enhance the slide 100.

Figure 5:
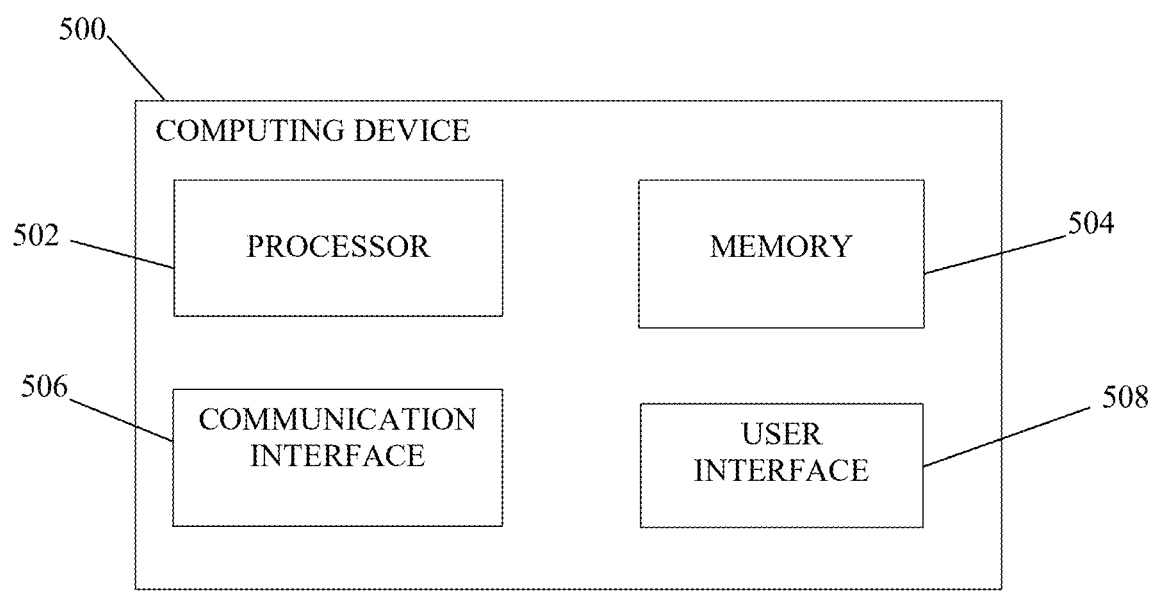
FIG. 5 is a schematic of a computing device used in the implementation.

FIG. 5 illustrates a schematic of a computing device 500 including a processor 502 having code therein, a memory 504, and a communication interface 506. Optionally, the computing device 500 can include a user interface 508, such as an input device, an output device, or an input/output device. The processor 502, the memory 504, the communication interface 506, and the user interface 508 are operatively connected to each other via any known connections, such as a system bus, a network, etc. Any component, combination of components, and modules of the system 400 in FIG. 4 can be implemented by a respective computing device 500. For example, the processor 408, the memory 410, the communication interface 412, the input/output device 414, and each of the set of modules 416-428 including the extraction module 416, the centralization module 418, the prompt generating module 420, the presentation generating module 422, the first generative AI module 424, the second generative AI module 426, and the third generative AI module 428 shown in FIG. 4 can be implemented by a respective computing device 500 shown in FIG. 5 and described below.

It is to be understood that the computing device 500 can include different components. Alternatively, the computing device 500 can include additional components. In another alternative implementation, some or all of the functions of a given component can instead be carried out by one or more different components. The computing device 500 can be implemented by a virtual computing device. Alternatively, the computing device 500 can be implemented by one or more computing resources in a cloud computing environment. Additionally, the computing device 500 can be implemented by a plurality of any known computing devices.

The processor 502 can be a hardware-based processor implementing a system, a sub-system, or a module. The processor 502 can include one or more general-purpose processors. Alternatively, the processor 502 can include one or more special-purpose processors. The processor 502 can be integrated in whole or in part with the memory 504, the communication interface 506, and the user interface 508. In another alternative implementation, the processor 502 can be implemented by any known hardware-based processing device such as a controller, an integrated circuit, a microchip, a central processing unit (CPU), a microprocessor, a system on a chip (SoC), a field-programmable gate array (FPGA), or an application-specific integrated circuit (ASIC). In addition, the processor 502 can include a plurality of processing elements configured to perform parallel processing. In a further alternative implementation, the processor 502 can include a plurality of nodes or artificial neurons configured as an artificial neural network. The processor 502 can be configured to implement any known machine learning (ML) based devices, any known artificial intelligence (AI) based devices, and any known artificial neural networks, including a convolutional neural network (CNN).

The memory 504 can be implemented as a non-transitory computer-readable storage medium such as a hard drive, a solid-state drive, an erasable programmable read-only memory (EPROM), a universal serial bus (USB) storage device, a floppy disk, a compact disc read-only memory (CD-ROM) disk, a digital versatile disc (DVD), cloud-based storage, or any known non-volatile storage.

The code of the processor 502 can be stored in a memory internal to the processor 502. The code can be instructions implemented in hardware. Alternatively, the code can be instructions implemented in software. The instructions can be machine-language instructions executable by the processor 502 to cause the computing device 500 to perform the functions of the computing device 500 described herein. Alternatively, the instructions can include script instructions executable by a script interpreter configured to cause the processor 502 and computing device 500 to execute the instructions specified in the script instructions. In another alternative implementation, the instructions are executable by the processor 502 to cause the computing device 500 to execute an artificial neural network. The processor 502 can be implemented using hardware or software, such as the code. The processor 502 can implement a system, a subsystem, or a module, as described herein.

The memory 504 can store data in any known format, such as databases, data structures, data lakes, or network parameters of a neural network. The data can be stored in a table, a flat file, data in a filesystem, a heap file, a B+ tree, a hash table, or a hash bucket. The memory 504 can be implemented by any known memory, including random access memory (RAM), cache memory, register memory, or any other known memory device configured to store instructions or data for rapid access by the processor 502, including storage of instructions during execution.

The communication interface 506 can be any known device configured to perform the communication interface functions of the computing device 500 described herein. The communication interface 506 can implement wired communication between the computing device 500 and another entity. Alternatively, the communication interface 506 can implement wireless communication between the computing device 500 and another entity. The communication interface 506 can be implemented by an Ethernet, Wi-Fi, Bluetooth, or USB interface. The communication interface 506 can transmit and receive data over a network and to other devices using any known communication link or communication protocol.

The user interface 508 can be any known device configured to perform user input and output functions. The user interface 508 can be configured to receive an input from a user. Alternatively, the user interface 508 can be configured to output information to the user. The user interface 508 can be a computer monitor, a television, a loudspeaker, a computer speaker, or any other known device operatively connected to the computing device 500 and configured to output information to the user. A user input can be received through the user interface 508 implementing a keyboard, a mouse, or any other known device operatively connected to the computing device 500 to input information from the user. Alternatively, the user interface 508 can be implemented by any known touchscreen. The computing device 500 can include a server, a personal computer, a laptop, a smartphone, or a tablet.

Figure 6:
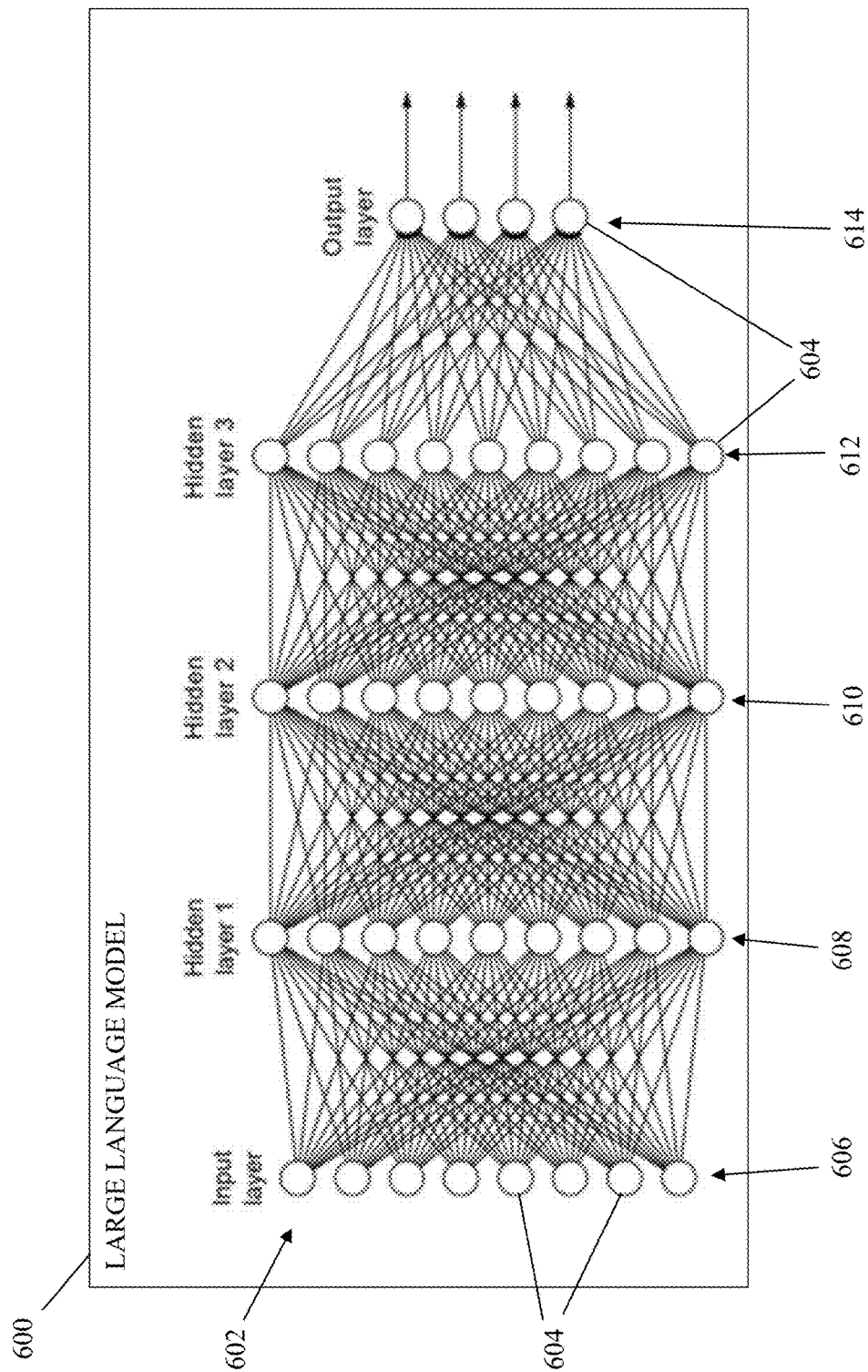
FIG. 6 is a schematic of a large language model including a neural network.
Figure 7:
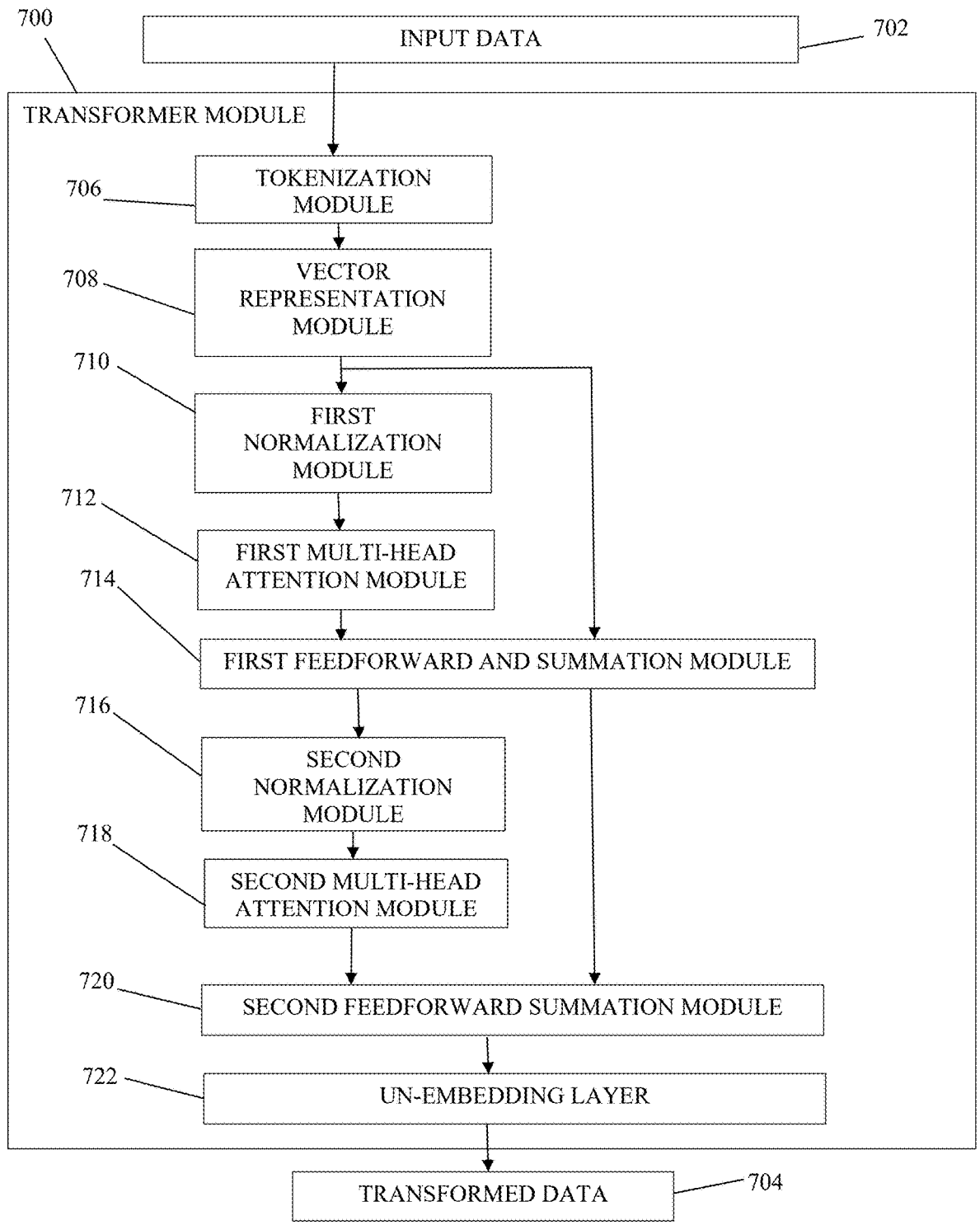
FIG. 7 is a schematic of a transformer module used in the large language model of FIG. 6.

Referring to FIGS. 4 and 6-7, in an implementation consistent with the invention, each of the first generative AI module 424, the second generative AI module 426, and the third generative AI module 428 are implemented using the large learning model (LLM) 600 shown in FIG. 6 having a neural network 602 utilizing a transformer architecture such as the transformer module 700 shown in FIG. 7. In one implementation, the large learning model 600 is the GENERATIVE PRE-TRAINED TRANSFORMER 4 (GPT-4) publicly available from OPENAI, INC.

As shown in FIG. 6, the neural network 602 includes a plurality of nodes or artificial neurons 604 arranged in a plurality of layers 606, 608, 610, 612, 614. The layer 606 is an input layer, and the layer 614 is an output layer, with the layers 608, 610, 612 being at least one hidden layer between input layer 606 and the output layer 614. In an implementation consistent with the invention, the neural network 602 implementing the transformer module 700 shown in FIG. 7 is an N layer transformer model with a hidden layer size of H, in which N and H are integers greater than or equal to one. In one implementation, the values of N and H are predetermined values. For example, N equals 120 and H equals 12,288, and so the transformer model has 120 layers with a hidden layer size of 12,228. In another implementation, the values of N and H are set or changed by a system administrator by inputting desired values N and H using the input/output device 414 to configure the transformer model to have N overall layers, and to configure hidden layers of the transformer model to have H hidden layers. The values of N and H are stored in the memory 410.

In an implementation, as shown in FIG. 7, the transformer module 700 includes a tokenization module 706, a vector representation module 708, a first normalization module 710, a first multi-head attention module 712, a first feedforward and summation module 714, at least a second normalization module 716, at least a second multi-head attention module 718, at least a second feedforward and summation module 720, and an un-embedding layer 722. The tokenization module 706 generates tokens corresponding to the input data 702. The vector representation module 708 acts as an embedding layer, which converts the tokens and positions of the tokens into vector representations as vectorized chunks of the input data 702. In an implementation, the vector representations are stored in a vector embedding database in the memory 410 in FIG. 4. Multiple sets of the components 710-720 are chained to carry out repeated transformations on the vector representations, extracting more and more linguistic information, using alternating attention and feedforward layers. The final transformed vector representations are converted by the un-embedding layer 722 back to a probability distribution over the tokens to generate the transformed data 704.

Figure 8:
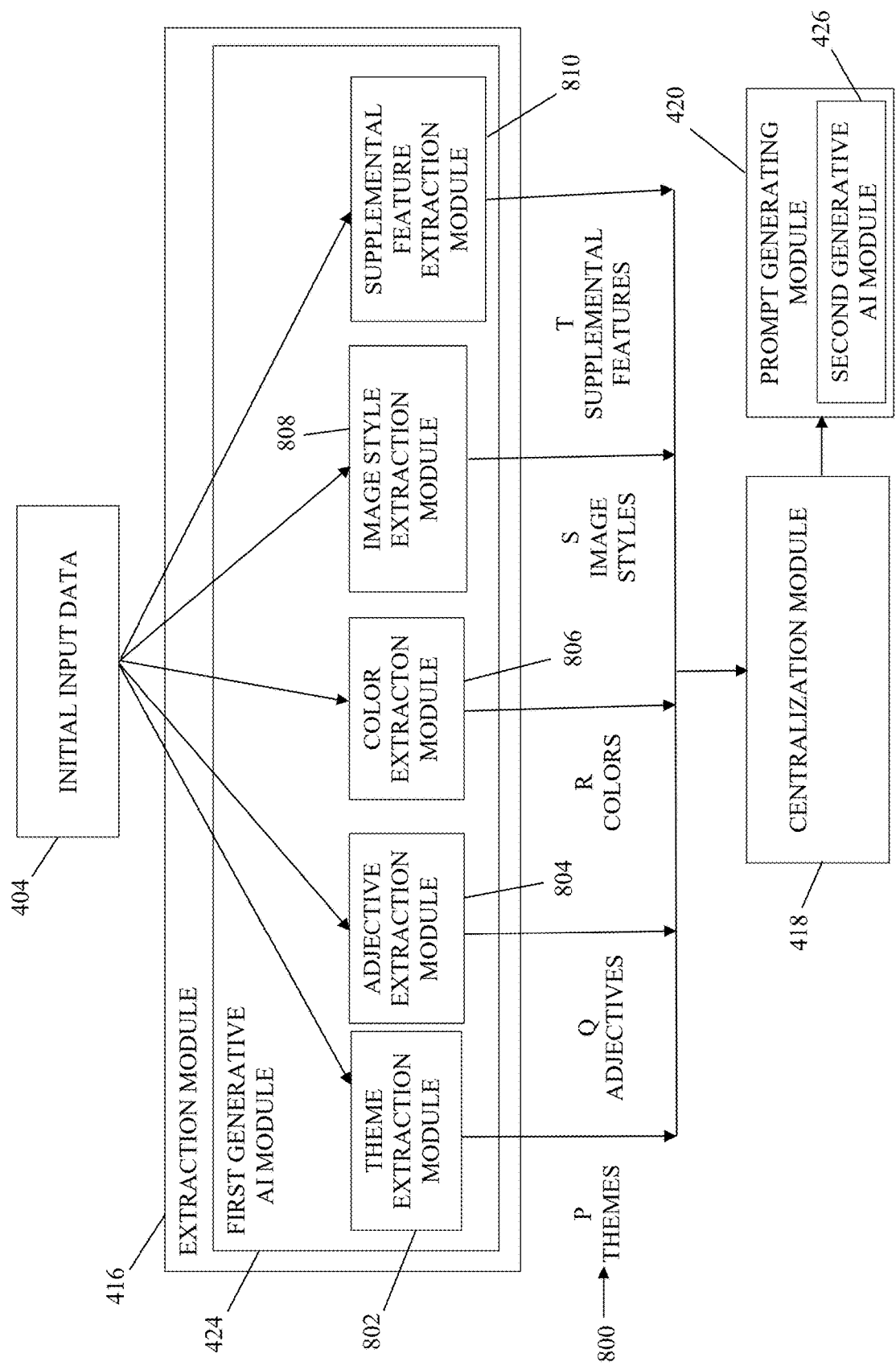
FIG. 8 is a schematic of the extraction process employed by the system of FIG. 4.

Referring to FIGS. 4 and 8, in an implementation consistent with the invention, the system 400 operates such that the presentation generating system 402 receives the initial input data 404 through the communication interface 412, and saves the initial input data 404 in the memory 410. In another implementation, the processor 408 processes a slide 100 having the initial input data 404, and generates the initial input data 404. For example, the processor 408 uses the TYPESCRIPT application publicly available from MICROSOFT CORPORATION to generate the initial input data 404 from an input slide 100. As shown in FIG. 8, the extraction module 416 receives the initial input data 404, and uses the first generative AI module 424 to extract a plurality of features 800 from the initial input data 404. In an implementation, features 800 are in a text-based format.

In an implementation, the first generative AI module 424 includes a theme extraction module 802, an adjective extraction module 804, a color extraction module 806, and an image style extraction module 808. The theme extraction module 802 is configured to extract P themes from the initial input data 404. The adjective extraction module 804 is configured to extract Q adjectives from the initial input data

404. The color extraction module 806 is configured to extract R colors from the initial input data 404. The image style extraction module 808 is configured to extracts S image styles from the initial input data 404. In an implementation, each of the parameters P, Q, R, and S are integers greater than or equal to one. For example, as shown in FIG. 9, the default value of P is one, while the default values of Q, R, and S are five. In an implementation, a system administrator uses the input/output device 414 to input, set, or change the parameters P, Q, R, and S stored in the memory 410.

In another implementation, the first generative AI module 424 optionally includes a supplemental feature extraction module 810 configured to extract T supplemental features from the initial input data 404. The parameters T is an integer greater than or equal to one. The default value of T is one. Such supplemental features include an image, a video, a sound, a sound style such as a type of music, three-dimensional (3D) video, 3D objects, QR codes encoding website information, URLs, barcodes, etc. as output formats. In an implementation, a system administrator uses the input/output device 414 to input, set, or change the parameter T stored in the memory 410.

In one implementation, the extraction module 416 applies the initial input data 404 to the first generative AI module 424 to perform the extraction of the plurality of features 800 from the initial input data 404. The plurality of features 800 include a plurality of terms. In an implementation, the terms are in a text-based format. As shown in FIG. 9, a data structure 900 includes a set of extracted features 902, a default number 904 of terms to be extracted from the slide 100, and extraction instructions 906 to be applied to the first generative AI module 424. For example, the data structure 900 is a table. In another example, the data structure 900 is an array of records. In a further example, the data structure 900 is any known arrangement of data to be used by the first generative AI module 424. In one implementation, the data structure 900 is stored in the memory 410. In another implementation, the data structure 900 is stored in a memory of the extraction module 416.

In an implementation, the extraction module 416 uses extractions instructions, such as the example extraction instructions 906, shown in FIG. 9, to process the initial input data 404. In one implementation, the extraction instructions 906 are text in a text-based format. For example, the extraction instructions 906 are stored in the memory 410. In another example, the extraction instructions are stored in a memory of the extraction module 416. In one implementation, the extraction instructions 906 are created by a system administrator or a technician using the input/output device 414. In another implementation, the extraction instructions are pre-generated extraction instructions received from a third-party data source through the communication interface 412. The extraction module 416 inputs the initial input data 404 to the first generative AI module 424 to generate the terms for each feature, such as the example terms 1004 for each feature as shown in FIG. 10, under the guidance, control, or constraints of the extraction instructions 906. The extraction instructions 906 guide, control, or constrain the first generative AI module 424 of the extraction module 416 by focusing the extraction module 416 on the terms 1004 determined and defined by the various extraction modules 802, 804, 806, 808, 810 instead of having the first generative AI module 424 seeing and analyzing the whole input. Accordingly, the extraction instructions 906 create an artificial "keyhole" view of the content without explicit fine-tuning for the kind of content. In an implementation, the plurality of features 1002 and terms 1004 are in a text-based format.

In particular, the initial input data 404 are the input data 702, as text, applied to the transformer 700 of the first generative AI module 424 shown in FIG. 7. The first generative AI module 424 generates the extracted features 800 as the transformed data 704, as text, output by the transformer 700 of the first generative AI module 424 shown in FIG. 7.

In one implementation, the extraction module 416 generates the plurality of extracted features 800 having a text format. For example, as shown in FIG. 10, a table 1000 includes a set 1002 of extracted features, and a set of terms 1004 describing each of the extracted features 800, with the sets 1002, 1004 having a text format. In one implementation, the set 1002 of extracted features includes themes, adjectives, color, and image styles, and the set 1004 of terms include "investment" as the extracted theme; "committing", "additional", "profitable", "important", and "investing" as the extracted adjectives; "green", "gold", "blue", "grey", and "white" as the extracted colors; and "financial", "educational", "infographic", "professional", and "simplistic" as the extracted image styles. In another implementation, the extraction module 416 generates the plurality of extracted features 800 as text in the HyperText Markup Language (HTML), the Standard Generalized Markup Language (SGML), or the Extensible Markup Language (XML), with delimiters positioned on each side of the extracted features, such as the delimiters "< >" and "</>". By using delimiters, the extracted features 800 are easily processed. In a further implementation, the extraction module 416 generates the plurality of extracted features 800 with each of the extracted features 800 associated with tags such as "<color>" and "</color>" on either side of an extracted color for ease of processing. In still another implementation, the extraction module 416 generates the plurality of extracted features 800 in any known data format.

The extracted plurality of features 800 are transmitted, conveyed, or otherwise provided to the centralization module 418. In one implementation, the centralization module 418 collects such extracted features 800 in the memory 410. In another implementation, the centralization module 418 collects such extracted features 800 in a memory of the centralization module 418. The centralization module 418 transmits, conveys, or otherwise provides the extracted features 800 to the prompt generating module 420. In another implementation, the centralization module 418 formats the features 800 into a predetermined format compatible for processing by the prompt generating module 420.

In an implementation, the prompt generating module 420 uses prompt instructions, such as the set 1100 of prompt instructions, shown in FIG. 11, to process the extracted features 800. In one implementation, the prompt instructions are text in a text-based format. For example, the prompt instructions are stored in the memory 410. In another example, the prompt instructions are stored in a memory of the prompt generating module 420. In one implementation, the prompt instructions are created by a system administrator or a prompt engineering technician using the input/output device 414. In another implementation, the prompt instructions are pre-generated prompt instructions received from a third-party data source through the communication interface 412. The prompt generating module 420 inputs the extracted features 800 shown in FIG. 8, to the second generative AI module 426 to generate a prompt, such as the example prompt 1200 as shown in FIG. 12, under the guidance, control, or constraints of the set 1100 of prompt instructions. In an implementation, the prompt 1200 is in a text-based format.

In particular, the extracted features 800 are the input data 702, as text, applied to the transformer 700 of the second generative AI module 426 shown in FIG. 7. The second generative AI module 426 generates the prompt 1200 as the transformed data 704, as text, output by the transformer 700 of the second generative AI module 426 shown in FIG. 7. The set 1100 of prompt instructions guide, control or constrain the second generative AI module 426 during prompt generation by enforcing rules on how the second generative AI module 426 is to use data from the table 1000, such as the set 1002 of features, by explicitly maximizing the term count use per prompt.

As shown in FIG. 11, the set 1100 of prompt instructions include various aspects of how a prompt is to be created by the second generative AI module 426. For example, the set 1100 of instructions includes a basic instruction "create a prompt for a scene using the extracted features and terms". In another example, the granularity of the degree of detail is specified in the set 1100 of instructions, such as "The prompt is to describe every detail of a scene". In a further example, the set 1100 of instructions specify a minimum number of extracted features to be used, such as "The prompt should use at least one theme, at least one adjective, at least one color, and at least one image among the terms provided." In an additional example, the set 1100 of instructions provide an abstract degree of flexibility in creating the prompt, such as "The scene should be minimalistic and creative." In still another example, the set 1100 of instructions impose at least one constraint on the created prompt, such as "The prompt should be at most 150 words in length."

In one implementation, the prompt generating module 420 uses the Chain-of-Thought (CoT) prompting technique, the Chain-of-Symbol (CoS) prompting technique, or any known prompting technique. In another implementation, the prompt generating module 420 uses the Retrieval-Augmented Generation (RAG) technique, the Graph Retrieval-Augmented Generation (GraphRAG) technique, or any other known automatic prompt generation technique.

As shown in the example prompt 1200 in FIG. 12, the extracted features 800, such as the example extracted features 1004, are included in the generated prompt 1200. For illustrative purposes, the example extracted features 1004 are in bold and italics. Once the prompt 1200 shown in FIG. 12 is generated from the extracted features 800 using the prompt instructions 1100, the prompt 1200 is transmitted, conveyed, or otherwise provided to the presentation generating module 422 which includes the third generative AI module 428. In one implementation, the third generative AI module 428 is a text-to-image generator, such as the DALL-E model, publicly available from OPENAI, which is a text-to-image model using deep learning methodologies to generate digital images from natural language descriptions such as the prompt 1200 shown in FIG. 12. In another implementation, the third generative AI module 428 is any known text-to-media generator, in which the media is text, images, audio, animation, video, or any other known media.

In an implementation consistent with the invention, the presentation generating module 422 includes a known presentation application or software such as POWERPOINT publicly available from MICROSOFT CORPORATION. In an implementation, the presentation application operates in conjunction with the third generative AI module 428. In another implementation, the presentation application is integrated with the third generative AI module 428.

The presentation generating module 422, using the third generative AI module 428 processing the prompt 1200, generates enhancements to the slide 100 corresponding to the initial input data 404 having the associated extracted features 800. In particular, the prompt 1200 is the input data 702, as text, applied to the transformer 700 of the third generative AI module 428 shown in FIG. 7. The third generative AI module 428 generates the enhancements as the transformed data 704, for example, text, images, audio, animation, video, or any other known media, output by the transformer 700 of the third generative AI module 428 shown in FIG. 7.

Figure 13A:
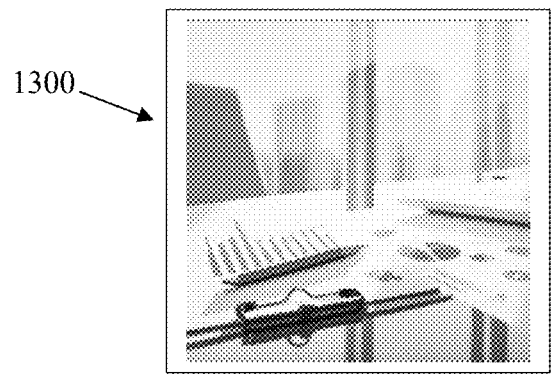
FIGS. 13A-13C are different images generated from the prompt in FIG. 12.
Figure 13B:
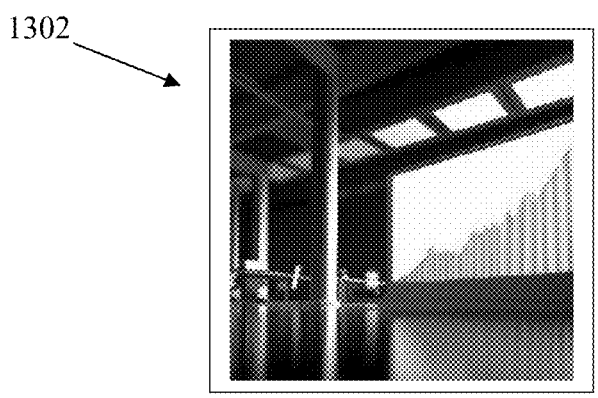
Figure 13C:
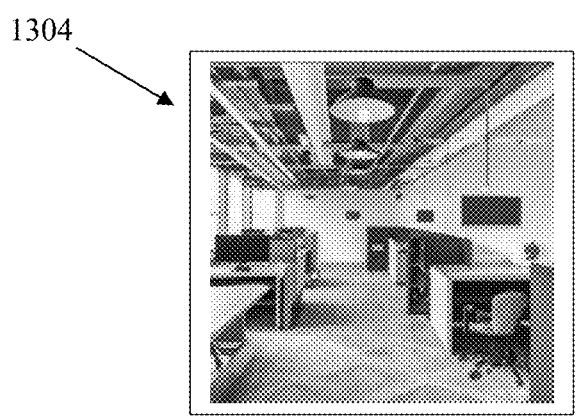

In an implementation consistent with the invention, in response to the prompt 1200, the presentation generating module 422, using the third generative AI module 428, generates at least one image 1300, 1302, 1304, as an enhancement media, shown in FIGS. 13A-13C, respectively, based on the prompt 1200 and the extracted features 800 therein. In another implementation, the third generative AI module 428 generates an enhancement media in any known format, including text, an image, audio, animation, video, numerical data, a graph representing numerical data, or any other known media. Depending on a value of a temperature parameter of the third generative AI module 428, different images 1300, 1302, 1304 are generated. Temperature is a parameter that controls the creativity or randomness of the text generated by a generative AI system, such as the third generative AI module 428. In an implementation, the temperature is in the range from 0.50 to 1.0, inclusive. In one implementation, the temperature is randomized, for example, using a known random number generator application. In another implementation, the temperature is set to a default value, such as 0.7 which is stored in the memory 410. In a further implementation, a system administrator uses the input/output device 414 to input, set, or change the temperature value stored in the memory 410. A higher temperature results in more diverse and creative output, while a lower temperature causes the output to be more deterministic and focused. The temperature affects the probability distribution over the possible tokens at each step of the generation process by the transformer module 700 shown in FIG. 7. A temperature of zero would make the third generative AI module 428 completely deterministic and always choosing the most likely token.

Depending on the temperature value, the third generative AI module 428 generates an image 1300, 1302, 1304 corresponding to the temperature value. In one implementation, the presentation generating module 422 formats the generated image 1300, 1302, 1304 into a suitable image format for use by the presentation application or software such as POWERPOINT publicly available from MICROSOFT CORPORATION. For example, a generated image 1300, 1302, 1304 is formatted to be in a Base64 encoded uniform resource identifier (URI) format for incorporation into the enhanced media presentation 406 displayed by POWERPOINT.

Figure 14:
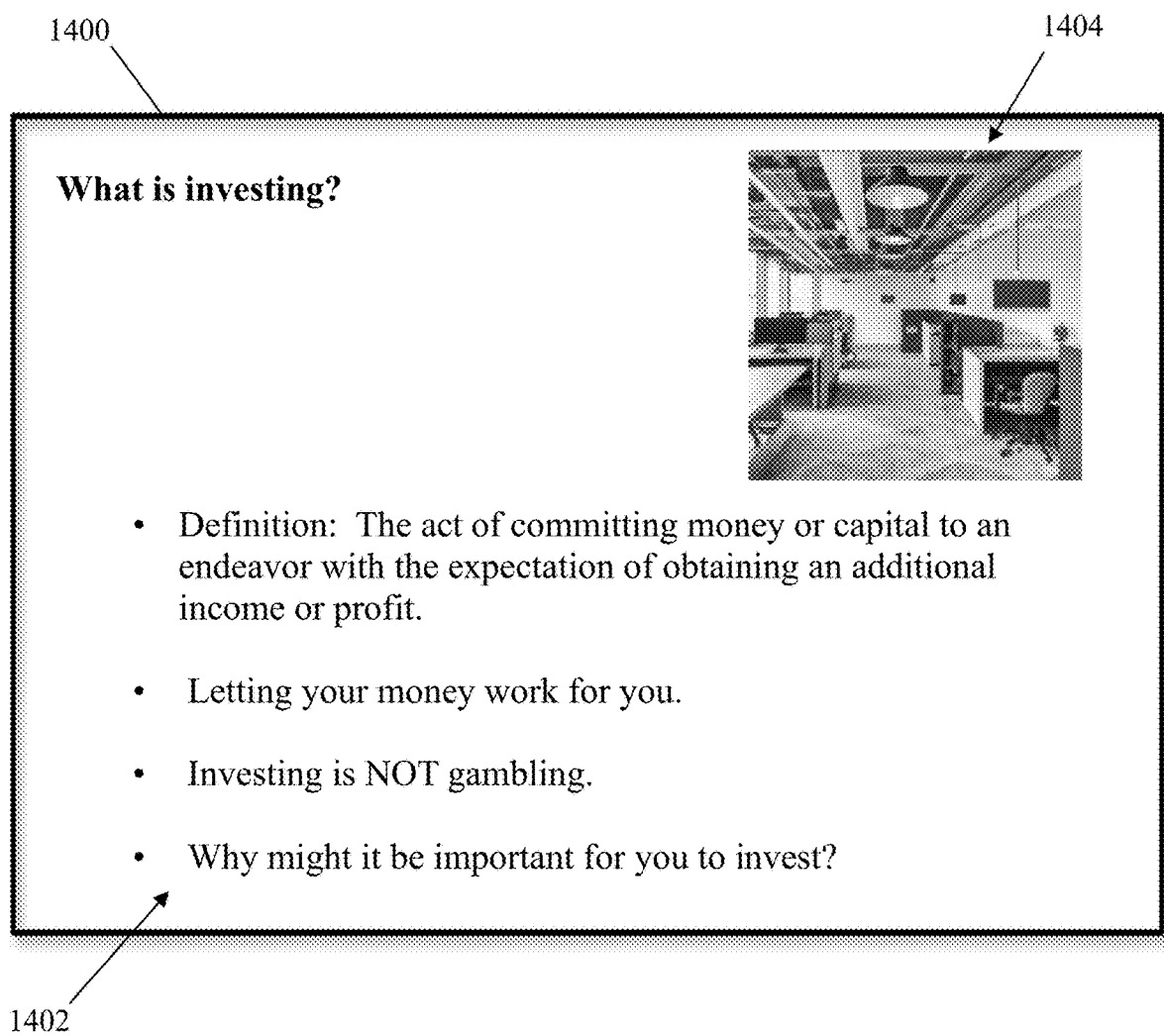
FIG. 14 is an enhanced media presentation.

The presentation generating module 422 generates the enhanced media presentation 406, being the slide 100 enhanced by media enhancements generated by the presentation generating system 402. For example, using the image 1306 generated by the third generative AI module 428 as described above, the presentation generating module 422 generates the enhanced media presentation 1400 shown in FIG. 14 which is output by the presentation generating system 402 as the enhanced media presentation 406. As shown in FIG. 14, the enhanced media presentation 1400 includes the text 1402 from the original slide 100 complemented or supplemented by the image 1404 derived from the image 1306.

Figure 15:
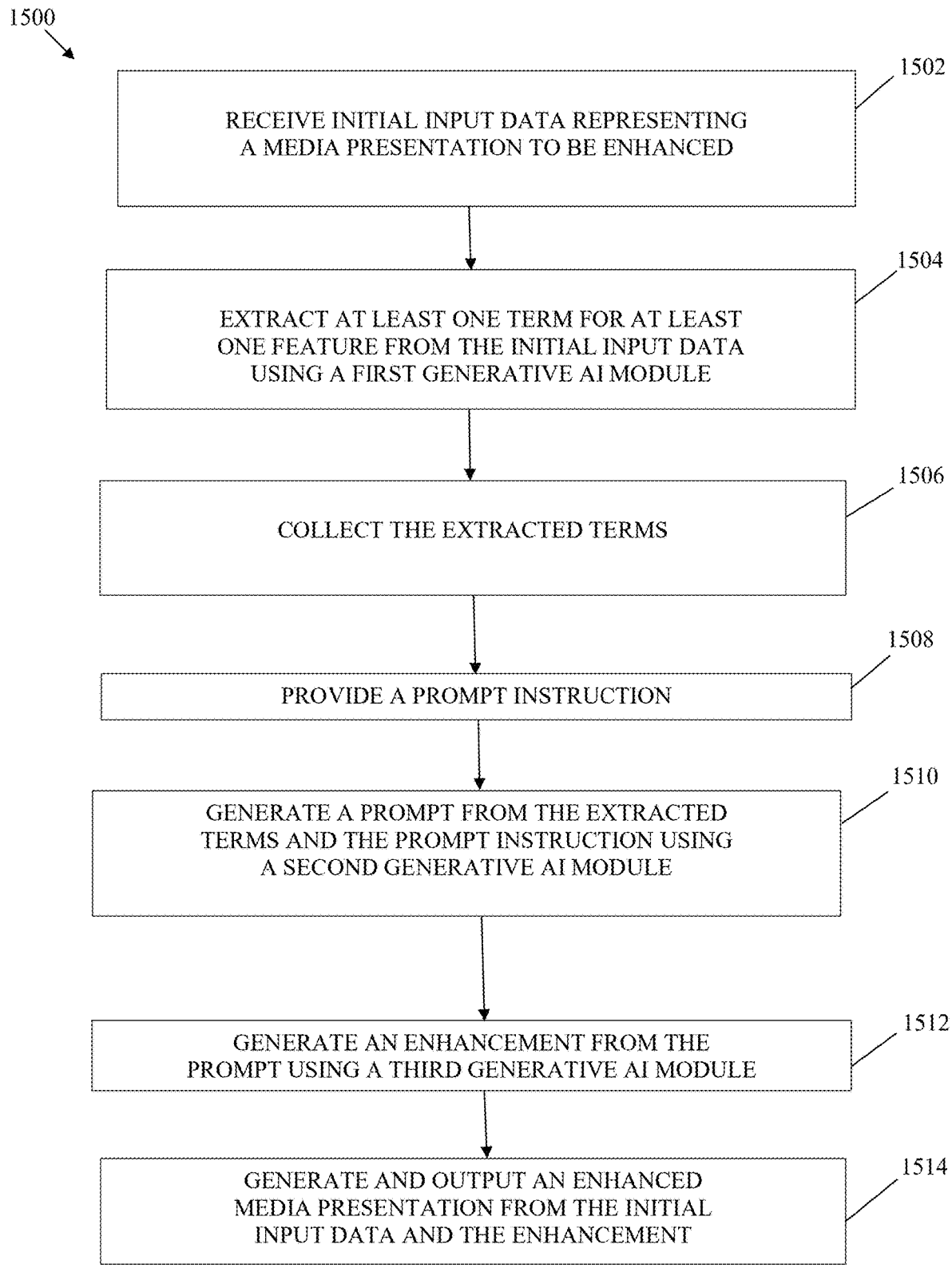
FIG. 15 is a flowchart of operation of the system of FIG. 4.

Referring to FIG. 15, a computer-based method 1500 includes receiving the initial input data 404 representing a media presentation to be enhanced in step 1502, extracting at least one term for at least one feature from the initial input data 404 using the first generative AI module 424 in step 1504, collecting the extracted terms 1004 using the centralization module 418 in step 1506, provide a prompt instruction 1100 in step 1508, generating a prompt 1200 from the extracted terms 1004 and the prompt instruction 1100 using the second generative AI module 426 in step 1510, generating an enhancement 1302, 1304, 1306 from the prompt 1200 using a third generative AI module 428 in step 1512, and generating and outputting an enhanced media presentation 406 from the initial input data 404 and the enhancement 1302, 1304, 1306 in step 1514.

In an implementation consistent with the invention, a non-transitory computer-readable storage medium stores instructions executable by a processor, such as the processor 408, to generate the enhanced media presentation 406 from the initial input data 404. The instructions include the steps 1502-1514 of the method 1500 shown in FIG. 15.

Portions of the methods described herein can be performed by software or firmware in machine readable form on a tangible or non-transitory storage medium. For example, the software or firmware can be in the form of a computer program including computer program code adapted to cause the system to perform various actions described herein when the program is run on a computer or suitable hardware device, and where the computer program can be implemented on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

It is to be further understood that like or similar numerals in the drawings represent like or similar elements through the several figures, and that not all components or steps described and illustrated with reference to the figures are required for all embodiments, implementations, or arrangements.

The terminology used herein is for the purpose of describing particular implementations only and is not intended to be limiting of the invention. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary implementations, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to implementations of the disclosure without departing from the essential scope thereof. Therefore, it is intended that the invention not be limited to the particular implementations disclosed, or to the best mode contemplated for carrying out this invention, but that the invention will include all implementations falling within the scope of the appended claims.

The subject matter described above is provided by way of illustration only and should not be construed as limiting. Various modifications and changes can be made to the subject matter described herein without following the example embodiments, implementations, and applications illustrated and described, and without departing from the true spirit and scope of the invention encompassed by the present disclosure, which is defined by the set of recitations in the following claims and by structures and functions or steps which are equivalent to these recitations.

What is claimed is:

1. A presentation enhancement system configured to enhance an initial media presentation having initial text, comprising:
   a hardware-based processor;
   a memory configured to store instructions and configured to provide the instructions to the hardware-based processor; and
   a set of modules configured to implement the instructions provided to the hardware-based processor, the set of modules including:
      an extraction module including a first generative artificial intelligence (AI) module configured to automatically extract a plurality of features from the initial text;
      a prompt generating module including a second generative AI module configured to automatically generate a prompt from the plurality of features; and
      a presentation generating module including a third generative AI module configured to automatically generate enhancement media from the prompt using a temperature parameter having a value set to a predetermined temperature value between 0.5 and 1.0, inclusive, and to automatically generate and output an enhanced media presentation combining the initial text with the enhancement media.

2. The presentation enhancement system of claim 1, wherein the third generative AI module automatically generates an image as the enhancement media from the prompt.

3. The presentation enhancement system of claim 1, wherein the first and second generative AI modules are text-to-text generative AI modules,
   wherein the plurality of features and the prompt are in a text format, and wherein the third generative AI module is a text-to-image generative AI module configured to automatically generate an image as the enhancement media from the text-formatted prompt.

4. The presentation enhancement system of claim 1, wherein each of the first, second, and third generative AI modules includes a neural network configured as a transformer to implement a large language model.

5. The presentation enhancement system of claim 1, wherein the plurality of features includes a theme, an adjective, a color, and an image style.

6. The presentation enhancement system of claim 5, wherein the extraction module further comprises:
   a theme extraction module configured to extract the theme from the initial text;
   an adjective extraction module configured to extract the adjective from the initial text;
   a color extraction module configured to extract the color from the initial text; and
   an image style extraction module configured to extract the image style from the initial text.

7. The presentation enhancement system of claim 1, wherein the value of the predetermined temperature parameter is set to a randomized temperature value between 0.5 and 1.0, inclusive.

8. A presentation enhancement system configured to enhance an initial media presentation having initial text, comprising:
   a hardware-based processor;
   a memory configured to store instructions and configured to provide the instructions to the hardware-based processor; and
   a set of modules configured to implement the instructions provided to the hardware-based processor, the set of modules including:
      an extraction module including a first generative artificial intelligence (AI) module implementing a first large language model and configured to automatically extract a plurality of features from the initial text;
      a prompt generating module including a second generative AI module implementing a second large language model and configured to automatically generate a prompt from the plurality of features; and
      a presentation generating module including a third generative AI module implementing a third large language model and configured to automatically generate enhancement media from the prompt using a temperature parameter having a value set to a predetermined temperature value between 0.5 and 1.0, inclusive, and to automatically generate and output an enhanced media presentation combining the initial text with the enhancement media.

9. The presentation enhancement system of claim 8, wherein the third generative AI module automatically generates an image as the enhancement media from the prompt.

10. The presentation enhancement system of claim 8, wherein the first and second generative AI modules are text-to-text generative AI modules,
   wherein the plurality of features and the prompt are in a text format, and
   wherein the third generative AI module is a text-to-image generative AI module configured to automatically generate an image as the enhancement media from the text-formatted prompt.

11. The presentation enhancement system of claim 8, wherein each of the first, second, and third generative AI modules includes a neural network configured as a transformer to implement the first, second, and third large language models, respectively.

12. The presentation enhancement system of claim 8, wherein the plurality of features includes a theme, an adjective, a color, and an image style.

13. The presentation enhancement system of claim 12, wherein the extraction module further comprises:
   a theme extraction module configured to extract the theme from the initial text;
   an adjective extraction module configured to extract the adjective from the initial text;
   a color extraction module configured to extract the color from the initial text; and
   an image style extraction module configured to extract the image style from the initial text.

14. The presentation enhancement system of claim 8, wherein the value of the predetermined temperature parameter is set to a randomized temperature value between 0.5 and 1.0, inclusive.

15. A computer-based method, comprising:
   receiving initial input data representing an initial media presentation;
   automatically extracting at least one term for at least one feature from the initial input data using a first generative artificial intelligence (AI) module;
   providing a prompt instruction;
   automatically generating a prompt from the extracted at least one term and from the prompt instruction using a second generative AI module;
   automatically generating an enhancement media from the prompt using a third generative AI module and a temperature parameter having a value set to a predetermined temperature value between 0.5 and 1.0, inclusive; and
   generating and outputting an enhanced media presentation from the initial input data and the enhancement media.

16. The computer-based method of claim 15, wherein each of the first, second, and third generative AI modules includes a neural network configured as a transformer to implement a large language model.

17. The computer-based method of claim 15, wherein the value of the predetermined temperature parameter is set to a randomized temperature value between 0.5 and 1.0, inclusive.

\* \* \* \* \*